(12) United States Patent
Porteous et al.

(10) Patent No.: US 10,419,347 B2
(45) Date of Patent: Sep. 17, 2019

(54) CENTRALIZED TRANSACTION COLLECTION FOR METERED RELEASE

(71) Applicant: Experian Health, Inc., Franklin, TN (US)

(72) Inventors: Grant Porteous, Spring Hill, TN (US); Josh Riddell, Mount Juliet, TN (US); Joe Hardaway, Nashville, TN (US)

(73) Assignee: Experian Health, Inc., Franklin, TN (US)

(*) Notice: Subject to any disclaimer, the term of this patent is extended or adjusted under 35 U.S.C. 154(b) by 147 days.

(21) Appl. No.: 15/471,849

(22) Filed: Mar. 28, 2017

(65) Prior Publication Data

US 2018/0285160 A1 Oct. 4, 2018

(51) Int. Cl.
*G06F 9/46* (2006.01)
*H04L 12/801* (2013.01)

(52) U.S. Cl.
CPC .................... *H04L 47/10* (2013.01)

(58) Field of Classification Search
CPC .................................................. G06F 9/5027
See application file for complete search history.

(56) References Cited

U.S. PATENT DOCUMENTS

| 9,292,336 B1* | 3/2016 | Ramalingam .......... G06Q 10/04 |
| 2011/0258630 A1* | 10/2011 | Fee ...................... G06F 9/4843 |
| | | 718/101 |
| 2018/0011744 A1* | 1/2018 | Liguori .................. G06F 9/526 |

* cited by examiner

*Primary Examiner* — Camquy Truong
(74) *Attorney, Agent, or Firm* — Merchant & Gould (57) ABSTRACT

Aspects of the present disclosure provide for managing electronic communications within a large scale computer architecture by intelligently, dynamically, and centrally managing a throughput of electronic transactions, but are not so limited. A disclosed system includes a centralized transaction accumulator that uses a draining algorithm to provide a metered release of accumulated electronic transactions within a computer architecture. A disclosed method operates to accumulate electronic transactions and uses a draining algorithm to provide a metered release of accumulated electronic transactions. A disclosed computer readable medium includes executable instructions that operate to centrally manage collection and/or release of accumulated electronic transactions.

20 Claims, 4 Drawing Sheets

CENTRALIZED TRANSACTION COLLECTION FOR METERED RELEASE

BACKGROUND

A widely distributed large scale computer architecture is a highly complex system that typically includes hundreds if not thousands of physical and/or virtual machines. Operational issues inevitably arise due in part to the large number and distribution of computing resources throughout the distributed computer architecture. Operational problems may be caused by significant hardware memory and disk space usage, disk errors, network hardware issues, insufficient or misconfigured hardware and/or software components, malfunctioning hardware and/or software components, etc.

Attempts have been made to implement focused operational procedures and/or parameters in order to maintain a well-functioning and responsive system where back and forth communications occur smoothly. For example, each worker machine of an array of worker node machines may utilize a local throttling technique in order to regulate incoming and/or outgoing network traffic and/or limit bandwidth congestion. A machine may employ embedded throttling logic that determines which applications or processes are allowed to use CPU and/or memory resources including rules that determine which application or process should execute before other applications or processes.

Local throttling attempts may give rise to bottlenecks that result in delays in sending, receiving, and/or processing electronic data. For example, a calling application's internal throttling logic may be employed when attempting to avoid releasing a flood of electronic data which may result in certain types of electronic data inadvertently being held back. The application is not aware of current processing issues throughout the system and thus has to artificially and crudely limit throughput. It is not uncommon for thousands of electronic transactions to be released to a clearinghouse computer system which, even using an application's internal throttling logic, may result in communication throughput and bottleneck issues. Local throttling may result in communication bottlenecks that may unduly limit performance of an associated machine and ultimately affect performance of the widely distributed large scale computer architecture. Unfortunately, the net impact is that bottlenecks result in delayed transaction processing, delayed queries, and delayed data access requests.

SUMMARY

Aspects of the present disclosure provide for managing electronic communications within a large scale computer architecture by intelligently, dynamically, and centrally managing a throughput of electronic transactions, but are not so limited. A system of an embodiment includes a centralized transaction accumulator that uses a draining algorithm to provide a metered release of accumulated electronic transactions within a computer architecture. A method of an embodiment centrally accumulates electronic transactions and uses a draining algorithm to provide a metered release of accumulated electronic transactions. A computer readable medium of an embodiment includes executable instructions that operate to centrally manage collection and/or release of accumulated electronic transactions. Other embodiments and implementations are available according to the following details.

DETAILED DESCRIPTION

Figure 1:
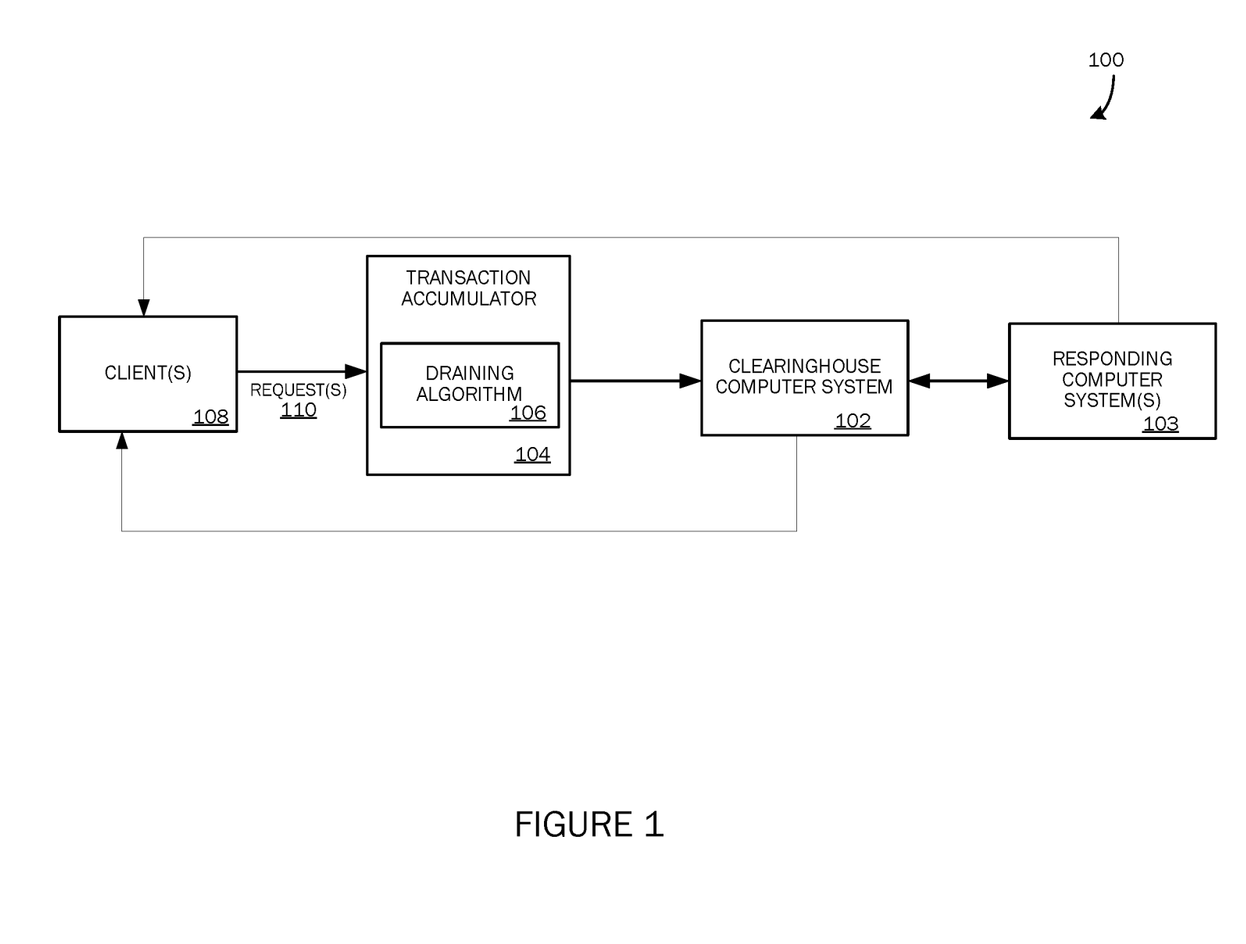
FIG. 1 is block diagram of a system that provides transaction collection and/or throttling features, according to an embodiment.

FIG. 1 is block diagram of a system 100 that intelligently, dynamically, and centrally manages a throughput of electronic transactions using transaction collection and/or throttling features, but is not so limited. As described below, the system 100 is able to prevent or minimize processing, bandwidth, memory, and/or other operational and performance bottlenecks by using centralized transaction accumulation and metered release features to manage accumulated electronic transaction data submitted by disparate applications and/or machines. The transaction management methodology can be used to manage transactions of various transaction types.

The system 100 can include multiple processors and disks coupled to a fast interconnection network to employ centralized intelligent metering features to determine when and how to send electronic transactions to a clearinghouse computer system (CCS) 102, but is not so limited. As an example, CCS 102 can provide a variety of functions including, but not limited to, receiving transactions, processing received transactions, verifying eligibility, submitting claims, following up on claims and posting remittances, etc. As described below, the system 100 enables the creation of rules and throughput thresholds that can be applied in conjunction with dynamic and adaptable metering logic to proficiently send transactions from the transaction accumulator 104 to the CCS 102; and ultimately to each responding computer system 103 communicating with the CCS 102.

As shown in FIG. 1, the system 100 includes a central transaction accumulator 104 disposed between the CCS 102 and the clients 108. The transaction accumulator 104 of an embodiment includes a draining algorithm 106 that enables clients 108, such as disparate calling applications for example, to remove local throttling solutions and utilize centralized intelligent metering functionality. Removing local throttling logic results in a more streamlined machine operation since a calling application can focus on its core purpose without having to share processor and memory resources with local throttling logic. The system 100 allows for calling applications to execute without employing localized throttling logic which reduces conflicts and/or interruptions with core purpose logic.

As described below, the system 100 provides: application-specific rules and priorities for transaction release, adaptable metering logic that enables scaling out as additional metrics become available, and/or a centralized transaction accumulation repository to receive all or some defined portion of the associated requests 110. A set of application programming interfaces (APIs) may be exposed to the clients 108 that enable transaction communications via data calls understood by the API set. In some instances, an application may bypass transaction accumulator 104 and directly send transactions to CCS 102 or some other component. The system 100 provides a technical solution for throughput and bottleneck issues in part by centralizing collection of transactions and using the draining algorithm 106 as a transaction metering controller.

The system 100 enables use of one or more centralized executables to manage throughput by intelligently metering transactions to the CCS 102. The system 100 provides: configurable transaction metering operations based in part on operational or performance parameters (e.g., historic busy and light processing periods), dynamic and real-time endpoint specific capacity and health metering, dynamic and real-time overall system capacity and health metering, and/or priority overrides to enable dynamic shifting of which clients, users and/or interfaces get processed and in which processing order. The system 100 intelligently, dynamically, and centrally maximizes the throughput of transactions through the CCS 102 by moving a potential transaction bottleneck away from the clients 108 communicating transaction data to the CCS 102.

It will be appreciated that the centralized metering functionality provided by system 100 can be incorporated with disparate computer architectures to collect and/or intelligently meter transactions and is not limited to any particular electronic transaction functionality. Transaction accumulator 104 can intercept and accumulate transactions for subsequent metered release to CCS 102 as part of preventing or reducing potential bottlenecks. According to an embodiment, accumulated requests remain with the transaction accumulator 104 or may be passed to a backup system until a secondary process picks them up and sends them on to the CCS 102.

Transaction accumulator 104 and CCS 102 can be implemented as one or more physical and/or virtual computer systems to provide transaction metering operations after receiving transaction data from a plurality of locally and/or remotely connected applications or clients. For example, the transaction accumulator 104 can be used to receive transactions directly from one or more calling applications that are requesting automated transaction services from CCS 102. The transaction accumulator 104 operates in part as a central staging area or repository (e.g., a database server system) for electronic requests, where calling applications send transaction data directly to the transaction accumulator 104 instead of the CCS 102. Depending in part on an overall operational state of system 100, such as reflected by a number of performance metrics and/or transaction metrics for example, the transaction accumulator 104 uses the draining algorithm 106 to intelligently meter a release of accumulated transactions to the CCS 102. As an implementation example, a calling application (e.g., from a service provider computer system) may send a plurality of electronic requests directly to the transaction accumulator 104 as part of requesting information from one or more responding computer systems 103 via CCS 102.

The transaction accumulator 104 can utilize many factors that contribute to how many transactions should be sent to the CCS 102 at a particular point in time. For example, different types of performance or operational metrics associated with each responding computer system 103 and/or the CCS 102 can be processed to determine how many transactions to send to the CCS 102 at a particular point in time. Exemplary performance metrics include a transactions per second metric, number of packets per second metric, number of connections per second metric, number of concurrent connections metric, etc. The transaction accumulator 104 uses the draining algorithm 106 to consider priorities of transactions currently present and then, via a wired and/or wireless communication device, sends all or some portion of the accumulated transactions to the CCS 102.

The draining algorithm 106 of an embodiment is configured to determine a first bandwidth associated with a maximum number of transactions that can be sent to the CCS 102 and a second bandwidth associated with a maximum number of transactions that can be sent to at least one responding computer system 103 as part of determining which transactions to ultimately send to the CCS 102. According to one embodiment, the draining algorithm 106 uses the performance metrics to calculate a transaction bandwidth associated each responding computer system 103 and a transaction bandwidth associated with the CCS 102 in part to determine a maximum number of transactions that could be sent from the CCS 102 to each responding computer system 103 and overall to all of the responding computer systems 103 at a particular point in time, over some defined time period, after some defined period, etc.

The draining algorithm 106 of one embodiment uses a plurality of weighted factors that add up to the maximum number of transactions that could be sent to each responding computer system 103 and the maximum number of transactions that can be sent overall from the CCS 102. The weights of the weighted factors are configurable and can be set based on analysis of historic and/or trend data. The weighted factors of one embodiment are associated with, but are not limited to, existence of an inoperable or nonresponsive endpoint computer system (e.g., an endpoint computer system or network being down or inoperable or offline for scheduled performance of system maintenance, backup and upgrade functions, etc.), a transaction bandwidth (e.g., how many more transactions can be added to a given endpoint user's queue), system health (e.g., data center health), queuing system health, current response times (e.g., from the CCS 102 and/or one or more endpoint systems), a time of day, a day of the week, whether it is toward the beginning, end, or middle of a month, whether toward the beginning, end, or middle of a quarter, and/or historic transaction and priority data. As part of examining queue health, system health, and/or operational health, the system 100 of one embodiment is configured to determine and/or receive operational data to use as quantifying variables, such as processing performance metrics, capacity metrics, processing backlog data, application and code-level errors/metrics, etc.

To provide an illustrative calculation and output using the draining algorithm 106, assume that after a transaction bandwidth evaluation, system 100 determines that 100 transactions can be sent from the CCS 102 to a first endpoint computer system and that 100 transactions can be sent overall from the CCS 102 to all associated endpoint computer systems. The weighted factors for the first endpoint computer system may be 6, 6, 6, 6, 6, 14, 14, 14, 14, and 14 and overall for all associated endpoint computer systems the weighted factors may be 24, 24, 24, 24, 24, 42, 42, 42, 42, and 42. If everything is at 100% but the time of the day and day of the week factors are unfavorable and are scored at 50%, then the system 100 can only send 86 transactions to the first computer system and 344 transactions overall. In a situation where a computer system is down or otherwise unreachable, the system 100 can open a switch to short-circuit weighting operations for the particular computer system and not allow any transactions to be sent to an unreachable or nonresponsive computer system.

Once the system 100 has determined how many transactions can be sent overall from the CCS 102 and to each responding computer system 103 individually, the transaction accumulator 104 uses the draining algorithm 106 to determine which of the accumulated transactions to send to the CCS 102 at a particular point in time. Typically, transactions accumulated by the transaction accumulator 104 are initially assigned priority values in order to determine which transactions take precedence over other transactions when releasing transactions to CCS 102.

The draining algorithm 106 of one embodiment can calculate an overall priority score for each of the transactions and then select transactions with the highest priority scores to release to the CCS 102. As an example, transactions associated with one type of product or client initially may be assigned a higher priority and released before releasing transactions associated with another type of product or client. Transactions having a higher priority are sent to the CCS 102 before lower priority transactions. After sending the higher priority transactions to the CCS 102, the transaction accumulator 104 may reprioritize remaining transactions for subsequent release to the CCS 102. Transaction priority values may be defined based on a variety of parameters such as contractual variables, business rules, or some other criteria.

At defined times, the draining algorithm 106 can be used to determine whether to reprioritize transactions transmitted from multiple products and/or clients which have been accumulated by the transaction accumulator 104. The draining algorithm 106 of an embodiment uses a number of quantifying factors to calculate one or more of: a priority value for each transaction, a priority value for a group of transactions which may be based on a lowest priority value, an average priority value, or a highest priority value within the group, and/or priority values for select transactions received and/or accumulated by the transaction accumulator 104. The quantifying factors of one embodiment that are used to determine a priority score for a transaction include various transaction metrics, but are not limited to, a source interface of each transaction, an age of each transaction, client specific settings, how many transactions have already been sent for a product, how many transactions have already been sent for a client, how many transactions are outstanding for an endpoint computer system (e.g., payer computer system), and/or whether a transaction priority has been previously modified or reprioritized.

As an example of reprioritization via draining algorithm 106, assume that a type of product requires very quick transaction turnaround times, but a batch file of transactions has been sitting with the transaction accumulator 104 for days without progress, wherein a group priority value associated with the batch of transactions is lower than priority values of other accumulated transactions. For this example, the draining algorithm 106 may execute and determine that a certain number of the batch file transactions have priority over other transactions, including the type of product requiring quick turnaround times. As another example, if a computer system has a large backlog of transactions, the draining algorithm 106 can execute to focus on clearing that backlog before sending transactions to the CCS 102. The draining algorithm 106 is tunable and can incorporate various tuning parameters including historic transaction accumulation data, historic priority data, historic release data, etc.

Figure 2:
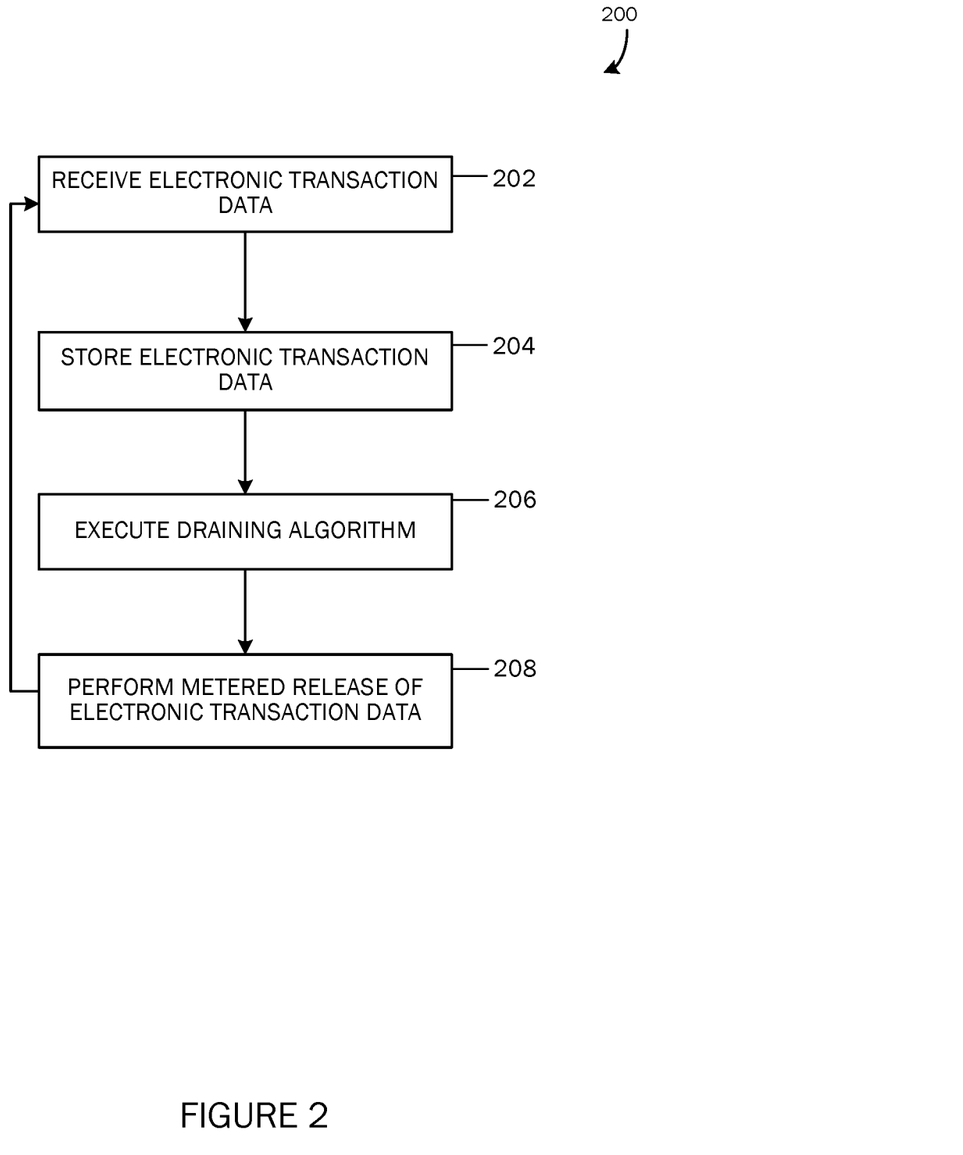
FIG. 2 is a flow diagram of a process that operates to centrally collect transaction data for a metered release, according to an embodiment.

FIG. 2 is a flow diagram of a process 200 that operates to centrally collect transaction data for a metered release to a computing system, such as CCS 102 for example, according to an embodiment. At 202, the process 200 operates to receive electronic transaction data associated with one or more requesting clients 108. For example, a service provider computer system may be programmed to send transaction data to an intermediary component (e.g., transaction accumulator 104) incrementally or in batch files during a certain time of day, weekly, monthly, etc. for subsequent metered release to CCS 102. The metered release can be intelligently managed based in part on throughput and other operational data associated with CCS 102 and/or one or more responding computer systems 103. It will be appreciated that the process 200 operates to receive and accumulate transaction data from a variety of clients 108 for subsequent metered release to the CCS 102.

At 204, the process 200 stores the accumulated transaction data in a computer readable repository. For example, the process 200 at 204 stores accumulated transaction data in a database server that organizes the accumulated transaction data by transaction ID, client, process, application, transaction type, priority, machine ID, and/or some other criteria. At 206, the process 200 operates to execute a draining algorithm 106 to determine which of the accumulated transactions to release to the CCS 102. The process 200 at 206 of an embodiment calculates a maximum number of transactions that can be sent to CCS 102 as well as a maximum number of transactions that can be sent to a machine 103 that is to respond to a subsequent communication from CCS 102.

The process 200 of one embodiment uses a plurality of weighted factors that add up to the maximum number of transactions that could be sent to each responding computer system 103 and the maximum number of transactions that can be sent overall from CCS 102. The weighted factors of one embodiment are associated with, but are not limited to, existence of an inoperable or nonresponsive endpoint computer system, a transaction bandwidth, system health, queuing system health, current response times, a time of day, a day of the week, whether it is toward the beginning, end, or middle of a month, whether toward the beginning, end, or middle of a quarter, and/or historic transaction data.

At 208, the process 200 operates to perform a metered release of the transaction data based on the output of the draining algorithm 106 and priority values associated with the accumulated transaction data. The process 200 of an embodiment uses a number of quantifying factors to calculate one or more of: a priority value for each transaction, a priority value for a group of transactions which may be based on a lowest priority value, an average priority value, or a highest priority value within the group, and/or priority values for certain calling applications that send transactions to be accumulated by the transaction accumulator 104.

The process 200 of one embodiment uses a number of quantifying factors to determine a priority score for a transaction including, but not limited to, a source interface of each transaction, an age of each transaction, client specific settings, how many transactions have already been sent for a product, how many transactions have already been sent for a client, how many transactions are outstanding for an endpoint computer system or overall, whether a transaction priority has been previously modified or reprioritized, etc. It will be appreciated that the process 200 intelligently releases transaction data to the CCS 102 according to throughput parameters and/or priority variables while reducing potential bottlenecks or other detrimental performance issues.

Figure 3:
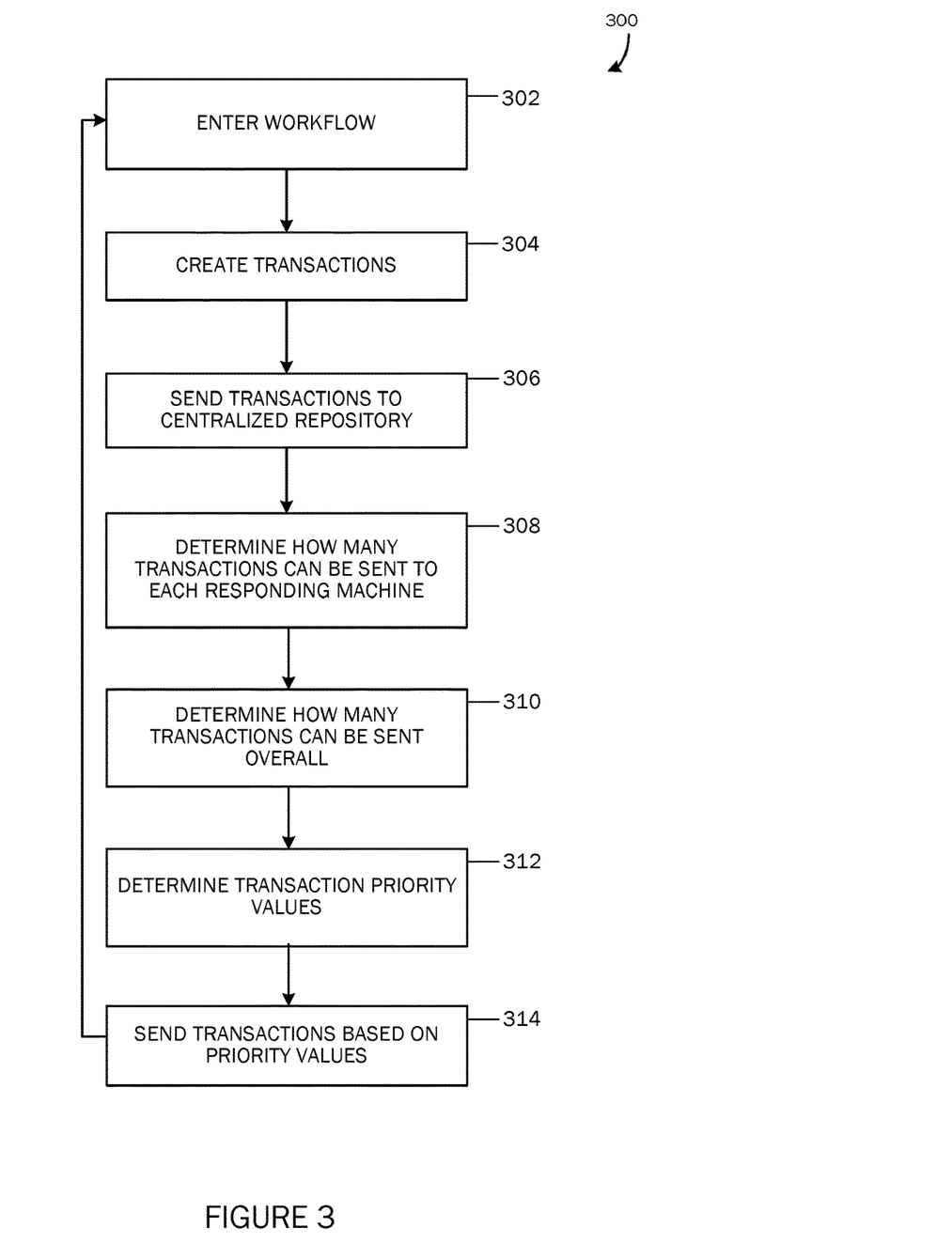
FIG. 3 is a flow diagram of a process that operates as part of a workflow to centrally collect transaction data for a metered release, according to an embodiment.

FIG. 3 is a flow diagram of a process 300 that operates as part of an exemplary workflow to centrally collect transaction data for a metered release, according to an embodiment. It will be appreciated that process 300 may be applied as part of different applications in part to collect and meter electronic transaction data. At 302, the process 300 begins a workflow. For example, the process 300 begins when a service provider sends an electronic request intended for CCS 102 for payment for services. At 304, the process 300 creates transaction data (e.g., for coverage discovery). At 306, the process 300 sends the transaction data which is received and accumulated at a centralized transaction repository (e.g., transaction accumulator 104) disposed before CCS 102 and one or more requesting computer systems 103. At 308, the process 300 uses draining algorithm 106 to determine how many transactions can be sent to each responding machine 103.

At 310, the process 300 uses the draining algorithm 106 to determine how many transactions can be sent overall from the CCS 102 as part of discovering coverage data. The process 300 of one embodiment uses a plurality of weighted factors that add up to the maximum number of transactions that could be sent to each responding computer system 103 and the maximum number of transactions that can be sent overall from CCS 102. The weighted factors of one embodiment are associated with, but are not limited to, existence of an inoperable or nonresponsive endpoint computer system, a transaction bandwidth, system health, queuing system health, current response times, a time of day, a day of the week, whether it is toward the beginning, end, or middle of a month, whether toward the beginning, end, or middle of a quarter, and/or historic transaction data.

At 312, the process 300 uses the draining algorithm 106 to determine a priority value associated with each transaction or a group of transactions. The process 300 of an embodiment uses a number of quantifying factors to calculate one or more of: a priority value for each transaction, a priority value for a group of transactions which may be based on a lowest priority value, an average priority value, or a highest priority value within the group, and/or priority values for select transactions received and/or accumulated by the transaction accumulator 104. The quantifying factors of one embodiment that are used to determine a priority score for a transaction include, but are not limited to, a source interface of each transaction, an age of each transaction, client specific settings, how many transactions have already been sent for a product, how many transactions have already been sent for a client, how many transactions are outstanding for an endpoint computer system or overall, whether a transaction priority has been previously modified or reprioritized, etc.

At 314, the process 300 uses the priority values to send certain transactions from the transaction accumulator 104 to the CCS 102. For example, the process 300 can use a scoring process to assign priority values to accumulated transactions in determining which of the accumulated transactions to send to the CCS 102 before other accumulated transactions. Transactions having higher priority values can be sent before transactions having lower priority values, dependent on a maximum number of the transactions that may be sent to CCS 102 at a particular time or over some time period.

Embodiments may be implemented via local and remote computing and data storage systems. Such memory storage and processing units may be implemented in a computing device, such as computing device 400 of FIG. 4. Any suitable combination of hardware, software, or firmware may be used to implement the memory storage and processing unit. For example, the memory storage and processing unit may be implemented with computing device 400 or any other computing devices 418, in combination with computing device 400, wherein functionality may be brought together over a network in a distributed computing environment, for example, an intranet or the Internet, to perform the functions as described herein. Such systems, devices, and processors (as described herein) are examples and other systems, devices, and processors may comprise the aforementioned memory storage and processing unit, consistent with disclosed embodiments.

Figure 4:
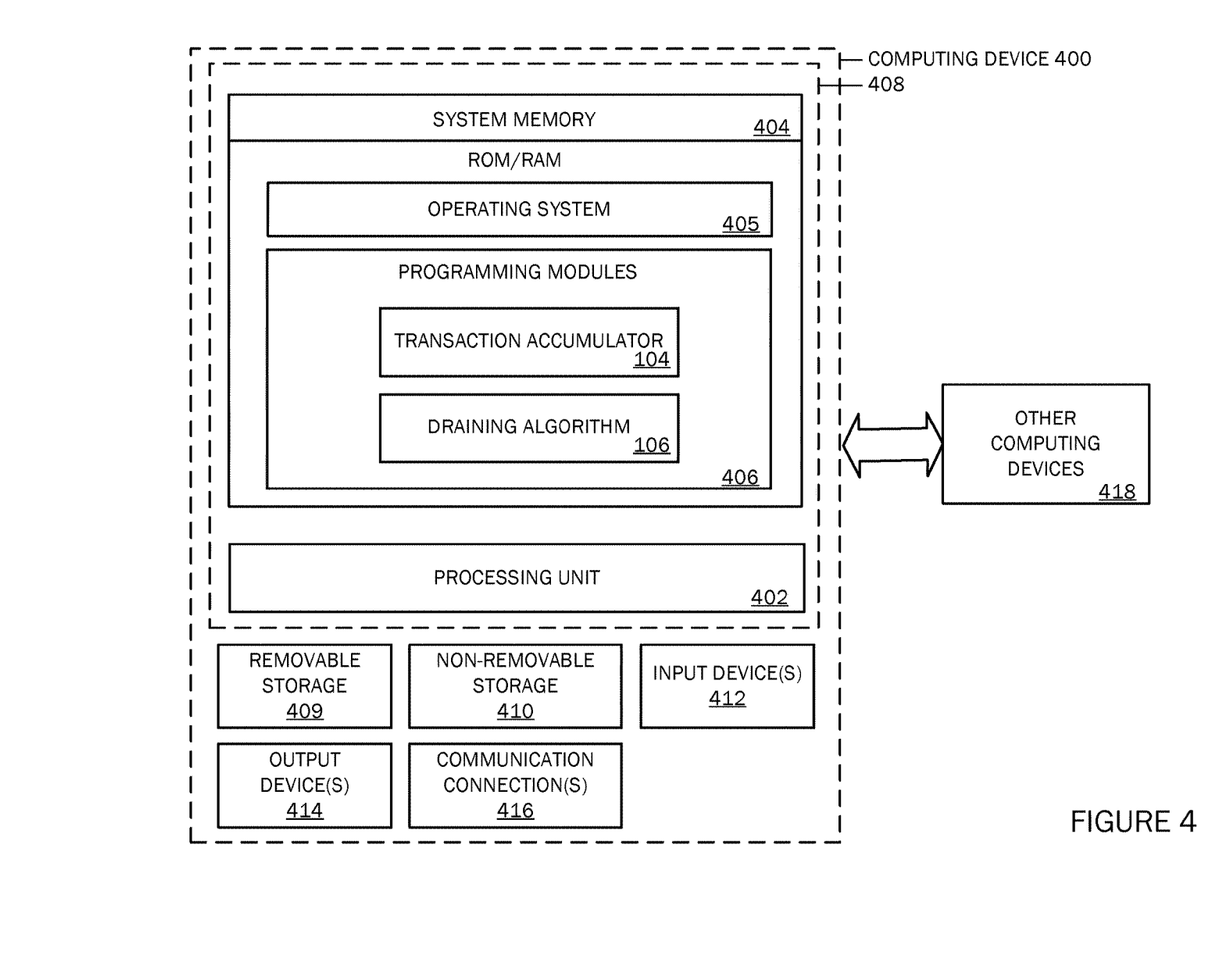
FIG. 4 is a simplified block diagram of a computing device with which embodiments may be practiced.

With reference to FIG. 4, a system consistent with embodiments may include one or more computing devices, such as computing device 400. The computing device 400 may include at least one processing unit 402 and a system memory 404. The system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include transaction accumulator 104 and/or draining algorithm 106 which are software applications having sufficient computer-executable instructions, which when executed, perform functionalities as described herein. Operating system 405, for example, may be suitable for controlling operation of computing device 400. Furthermore, embodiments may be practiced in conjunction with a graphics library, other operating systems, or any other application program and is not limited to any particular application or system. This basic configuration is illustrated in FIG. 4 by those components within a dashed line 408. Computing device 400 may also include one or more input device(s) 412 (keyboard, mouse, pen, touch input device, etc.) and one or more output device(s) 414 (e.g., display, speakers, a printer, etc.).

Although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

The computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

Program modules, such as logic associated with transaction accumulator 104 and/or draining algorithm 106 for example, may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable user electronics, minicomputers, mainframe computers, etc. Embodiments may also be practiced in distributed computing environments where tasks are performed by remote processing devices that are linked through a wired and/or wireless communication network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies.

Embodiments may be implemented as a computer process (method), a computing system, and/or as an article of manufacture, such as a computer program product or computer readable media. The computer program product may be a computer storage media readable by a computer system and encoding a computer program of instructions for executing a computer process. Accordingly, disclosed aspects may be embodied in hardware and/or in software (including firmware, resident software, micro-code, etc.). In other words, embodiments may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

Embodiments are described herein with reference to block diagrams and/or operational illustrations of methods, systems, and computer program products according to embodiments. The described functions taking place with respect to each process may be considered steps in a process routine performed by one or more local or distributed computing systems. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A system comprising:
   a transaction accumulator, including a processor and a memory storage device including instructions to configure the system to receive transactions from a plurality of requesting machines, wherein the transaction accumulator uses a draining algorithm to:
   determine a transaction throughput associated with a clearinghouse machine;
   determine a maximum number of transactions to release to the clearinghouse machine based in part on the transaction throughput;
   determine a priority score for each accumulated transaction or group of accumulated transactions according to one or more of a plurality of factors that include:
   a source interface associated with each transaction;
   an age of each transaction;
   client specific settings;
   a number of transactions already sent for a product;
   a number of transactions already sent for a client;
   a number of outstanding transactions; and
   whether a priority score for each transaction has been previously modified;
   select highest priority transactions from the accumulated transactions based on corresponding priority scores; and
   release the maximum number of transactions according to the corresponding priority scores to the clearinghouse machine, wherein the highest priority transactions are included with the release of the maximum number of transactions.

2. The system of claim 1, wherein the transaction accumulator uses a number of weighted factors to calculate the maximum number of transactions to release to the clearinghouse machine at a particular point in time.

3. The system of claim 1, further comprising a plurality of responding machines communicatively coupled to receive transactions from the clearinghouse machine, wherein the transaction accumulator determines an amount of available bandwidth associated with each responding machine and an amount of available bandwidth associated with the clearinghouse machine to calculate a maximum number of transactions that can be sent to each responding machine and the maximum number of transactions to release to the clearinghouse machine.

4. The system of claim 1, wherein the draining algorithm includes a number of weighted transaction processing factors to determine a value for the maximum number of transactions that can be sent to each responding machine or the clearinghouse machine.

5. The system of claim 4, wherein the weighted transaction processing factors include a majority of:
   a non-responsive machine;
   a transaction bandwidth;
   a data center health;
   a queuing system health;
   current transaction response times;
   time of the day;
   day of the week;
   time of the month;
   time of the year; and
   historic transaction data.

6. The system of claim 1, wherein the draining algorithm operates to limit throughput of transactions for the clearinghouse machine.

7. The system of claim 1, wherein the draining algorithm operates to determine a maximum number of transactions that could be sent to each responding computer system and a maximum number of transactions that can be sent overall from the clearinghouse machine.

8. The system of claim 1, wherein the draining algorithm operates to modify a priority score for one or more designated transactions or groups of transactions.

9. The system of claim 1, wherein the plurality of requesting machines comprise a plurality of requesting clients that do not include transaction throttling logic.

10. The system of claim 1, wherein the draining algorithm determines a value for the maximum number of transactions to release to the clearinghouse machine.

11. The system of claim 1, wherein the draining algorithm uses one or more machine performance metrics to determine a value for the maximum number of transactions to release to the clearinghouse machine and one or more transaction metrics to determine how to prioritize the accumulated transactions for the clearinghouse machine.

12. The system of claim 1, wherein the draining algorithm operates to determine a first bandwidth associated with a maximum number of transactions that can be sent to the clearinghouse machine and a second bandwidth associated with a maximum number of transactions that can be sent to at least one responding computer system.

13. The system of claim 1, further to use performance metrics to calculate a transaction bandwidth associated each responding computer system and a transaction bandwidth associated with the clearinghouse machine in part to determine a maximum number of transactions that could be sent from the clearinghouse machine to each responding computer system and overall to all of the responding computer systems.

14. The system of claim 1, further to apply throughput thresholds to apply in conjunction with adaptable metering logic to send transactions from the transaction accumulator to the clearinghouse machine.

15. A method of using a centralized transaction accumulator comprising:
using a draining algorithm to provide a metered release of accumulated transactions including:
determining a transaction throughput associated with a clearinghouse machine;
determining a maximum number of transactions to release to the clearinghouse machine based in part on the transaction throughput;
determining a priority score for each accumulated transaction or group of accumulated transactions according to one or more of a plurality of factors that include:
a source interface associated with each transaction;
an age of each transaction;
client specific settings;
a number of transactions already sent for a product;
a number of transactions already sent for a client;
a number of outstanding transactions; and
whether a priority score for each transaction has been previously modified;
selecting highest priority transactions from the accumulated transactions based on corresponding priority scores; and
releasing the maximum number of transactions according to the corresponding priority scores to the clearinghouse machine, wherein the highest priority transactions are included with the releasing of the maximum number of transactions.

16. The method of claim 15, further comprising
using the draining algorithm with a number of weighted transaction processing factors to determine a value for a maximum number of transactions that can be sent to each responding machine or the clearinghouse machine, wherein the weighted transaction processing factors include one or more of:
a non-responsive machine;
a transaction bandwidth;
a data center health;
a queuing system health;
current transaction response times;
time of the day;
day of the week;
time of the month;
time of the year; and
historic transaction data.

17. The method of claim 15, further comprising using the draining algorithm as part of determining a first bandwidth associated with a maximum number of transactions that can be sent to the clearinghouse machine and a second bandwidth associated with a maximum number of transactions that can be sent to at least one responding computer system.

18. A computer readable storage device that includes executable instructions which, when executed by a processor, provide a centralized transaction accumulator to:
apply a draining algorithm to selectively release accumulated transactions by:
determining a transaction throughput associated with a clearinghouse machine;
determining a maximum number of transactions to release to the clearinghouse machine based in part on the transaction throughput;
determining a priority score for each accumulated transaction or group of accumulated transactions according to one or more of a plurality of factors that include:
a source interface associated with each transaction;
an age of each transaction;
client specific settings;
a number of transactions already sent for a product;
a number of transactions already sent for a client;
a number of outstanding transactions; and
whether a priority score for each transaction has been previously modified;
selecting highest priority transactions from the accumulated transactions based on corresponding priority scores; and
releasing the maximum number of transactions according to the corresponding priority scores to the clearinghouse machine, wherein the highest priority transactions are included with the releasing of the maximum number of transactions.

19. The computer readable storage device of claim 18, wherein the draining algorithm uses a number of weighted transaction processing factors to determine a value for a maximum number of transactions that can be sent to each responding machine or the clearinghouse machine, wherein the weighted transaction processing factors include one or more of:
a non-responsive machine;
a transaction bandwidth;
a data center health;
a queuing system health;
current transaction response times;
time of the day;
day of the week;
time of the month;
time of the year; and
historic transaction data.

20. The computer readable storage device of claim 18, further comprising applying the draining algorithm as part of determining a first bandwidth associated with a maximum number of transactions that can be sent to the clearinghouse machine and a second bandwidth associated with a maximum number of transactions that can be sent to at least one responding computer system.

* * * * *